(12) United States Patent
Behin et al.

(10) Patent No.: US 6,788,520 B1
(45) Date of Patent: Sep. 7, 2004

(54) CAPACITIVE SENSING SCHEME FOR DIGITAL CONTROL STATE DETECTION IN OPTICAL SWITCHES

(76) Inventors: Behrang Behin, 2427 Hilgard Ave., #23, Berkeley, CA (US) 94709; Michael J. Daneman, 443 Gateway Dr., #109, Pacifica, CA (US) 94044; Meng-Hsiung Kiang, 1807 Spruce St., Berkeley, CA (US) 94709; Kam-Yin Lau, 5204 Blackhawk Dr., Danville, CA (US) 94506; Timothy E. Beerling, 1414 MLK Jr. Way, Berkeley, CA (US) 94709

(*) Notice: Subject to any disclaimer, the term of this patent is extended or adjusted under 35 U.S.C. 154(b) by 121 days.

(21) Appl. No.: 09/724,948

(22) Filed: Nov. 28, 2000

Related U.S. Application Data (60) Provisional application No. 60/196,055, filed on Apr. 10, 2000.

(51) Int. Cl.$^7$ .............................................. G02B 26/08
(52) U.S. Cl. ...................................................... 361/207
(58) Field of Search ......................... 361/207; 324/658; 385/18

(56) References Cited

U.S. PATENT DOCUMENTS

| | | | |
|---|---|---|---|
| 4,580,873 A | | 4/1986 | Levinson .................... 350/96.2 |
| 4,935,700 A | * | 6/1990 | Garbini et al. ............... 324/687 |
| 5,043,043 A | | 8/1991 | Howe et al. ................. 156/645 |
| 5,302,886 A | * | 4/1994 | Jacobsen et al. ............ 318/568 |
| 5,638,946 A | | 6/1997 | Zavracky ..................... 200/181 |
| 5,646,464 A | | 7/1997 | Sickafus ....................... 310/40 |
| 5,648,618 A | | 7/1997 | Neukermans et al. ..... 73/862.08 |

(List continued on next page.)

FOREIGN PATENT DOCUMENTS

| | | | |
|---|---|---|---|
| EP | 0683414 | 11/1995 | ........... G02B/26/08 |
| WO | 0057233 | 9/2000 | |

OTHER PUBLICATIONS

E. K. Chan et al, "Characterization of Contact Electromechanics Through Capacitance–Voltage Measurements and Simulations" Journal of Microelectromechanical Systems, vol. 8, No. 2, Jun. 1999.

(List continued on next page.)

*Primary Examiner*—Gregory J. Toatley, Jr.
*Assistant Examiner*—Z Kitov
(74) *Attorney, Agent, or Firm*—JDI Patent; Joshua D. Isenberg (57) ABSTRACT

Disclosed is an apparatus and method for detecting whether rotatable MEMS elements are in the "on" or "off" position. Embodiments of the invention have application in devices switches that employ mirrors that move between an "on" or "off" position, wherein they reflect light from an input fiber into an output fiber in the "on" position, and allow the light to pass in the "off" position. Electrodes are positioned in the device such that the mirrors are close to, and therefor capacitively coupled to, a different electrode depending on whether they are in the "on" or "off" position. This invention is especially useful for switches that already employ electrodes for electrostatic clamping of mirrors in one or more positions, since those same electrodes can be used both to electrostatically clamp the mirrors and to sense their position. The method described in this invention comprises sensing of the capacitance between the mirrors and the one or more electrodes used to clamp the mirrors in its one or more position in order to detect which of the positions the mirrors are clamped in. Furthermore, the magnitude of the capacitances can be monitored to detect improper clamping.

22 Claims, 5 Drawing Sheets

U.S. PATENT DOCUMENTS

| | | | |
|---|---|---|---|
| 5,717,631 A | 2/1998 | Carley et al. | 365/174 |
| 5,867,302 A | 2/1999 | Fleming | 359/291 |
| 5,881,598 A | 3/1999 | Sapuppo et al. | 74/5.6 E |
| 5,914,507 A | 6/1999 | Polla et al. | 257/254 |
| 5,960,132 A * | 9/1999 | Lin | 385/18 |
| 5,963,788 A | 10/1999 | Barron et al. | 438/48 |
| 5,969,848 A * | 10/1999 | Lee et al. | 359/298 |
| 5,971,355 A | 10/1999 | Biegelsen et al. | 251/129.06 |
| 5,998,906 A | 12/1999 | Jerman et al. | 310/309 |
| 6,025,951 A | 2/2000 | Swart et al. | 359/245 |
| 6,094,293 A * | 7/2000 | Yokoyama et al. | 359/280 |
| 6,396,975 B1 | 5/2002 | Wood et al. | 385/18 |
| 6,396,976 B1 * | 5/2002 | Little et al. | 385/18 |

OTHER PUBLICATIONS

E. K. Chan et al, "Electrostatic Micromechanical Actuator with Extended Range of Travel" Journal of Microelectromechanical Systems Dec. 2000.

P. Cheung et al. Design, Fabrication, Position Sensing, and Control of an Electrostatically–driven Polysilicon Microactuator, IEEE Transactions on Magnetics, vol. 32, No. 1, Jan. 1996.

A. Selvakumar, "A High–Sensitivity Z–Axis Capacitive Silicon Microaccelerometer with a Torsional Suspension", Journal of Microelectromechanical Systems, vol. 7, No. 2, Jun. 1998.

H. Toshioshi et al. "Electrostatic Micro Torsion Mirrors for an Optical Switch Matrix" Journal of Microelectromechanical Systems, vol. 5 No. 4, 231–7 Dec. 1996.

L.Y. Lin et al. "Free–Space Micromachined Optical Switches with Sub–Millisecond Switching Time for Large–Scale Optical Cross Connects" OFC '98 and IEEE Photonics Technol. Lett., Apr., 1998.

* cited by examiner

CAPACITIVE SENSING SCHEME FOR DIGITAL CONTROL STATE DETECTION IN OPTICAL SWITCHES

CROSS REFERENCE TO RELATED APPLICATION

This application is based on Provisional application No. 60/196,055, filed Apr. 10, 2000, which is herein incorporated by reference.

FIELD OF THE INVENTION

This invention relates generally to microelectromechanical systems (MEMS). More particularly, it relates to sensing a control state of MEMS devices.

BACKGROUND ART

Figure 1:
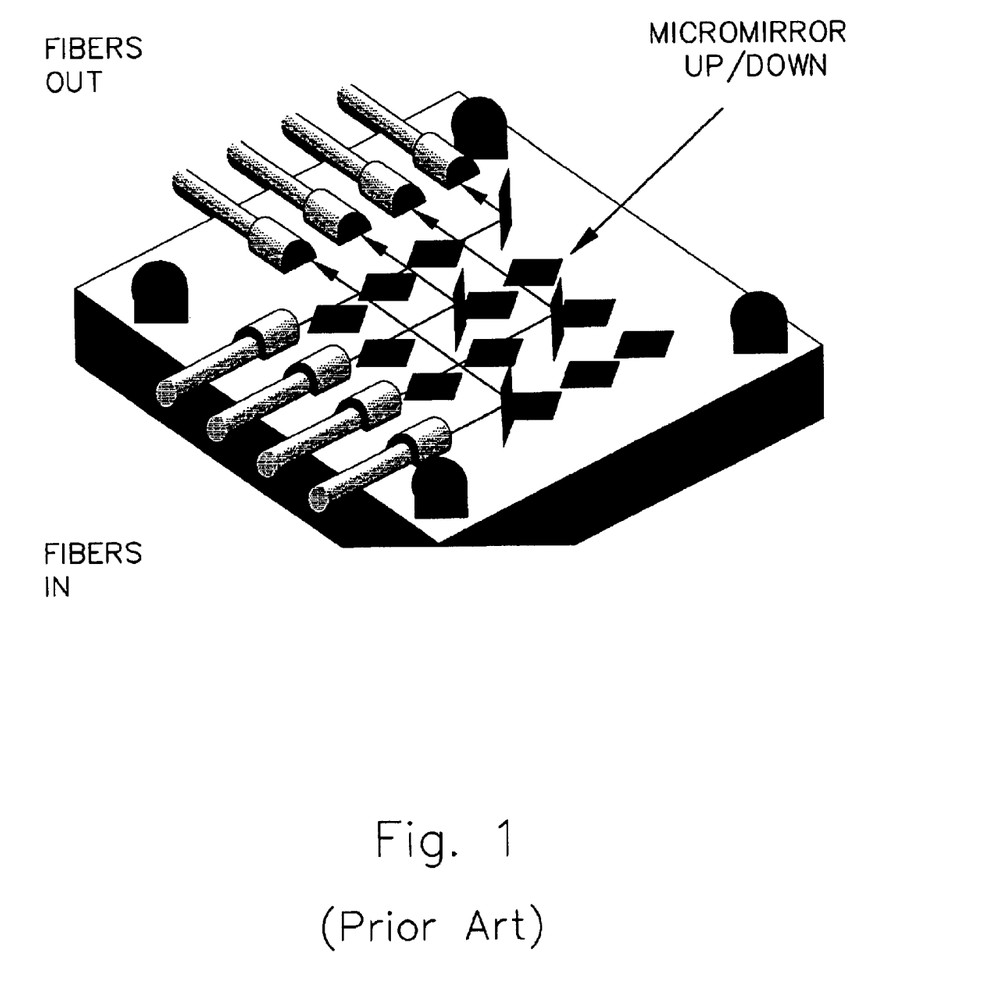
FIG. 1 depicts a crossbar configuration for a MEMS optical switch according to the prior art.

Previous patents and publications have described fiber-optic switches that employ moveable micromirrors that move between two positions. An example is shown in FIG. 1. Some of the prior art also employs electrostatic clamping of these mirrors at one or more of its two positions. For example, optical crossbar switches consisting of a series of moveable mirrors that are magnetically actuated are known in the art. The mirrors can be electrostatically clamped either in the horizontal position to the substrate or in the vertical position to the sidewalls of a separate chip. In the vertical position, the mirrors deflect light from an input fiber into an output fiber.

Previous work has described optical switches that use mirrors that are actuated between several discrete positions for switching light. These optical switches may rely on electrostatic comb drives to rotate the mirror. An electrostatic comb drive uses electrostatic forces between interdigitated fixed and movable comb members to rotate a device such as a mirror. It is possible to determine the relative angular position of the movable comb drive member with respect to the fixed comb drive member by measuring the capacitance between them. Unfortunately, comb drives have a limited range of angular movement and the capacitance may change only slightly over a desired range of discrete positions of the mirror. If each discrete position represents a different control state of an optical switch, it is difficult to correlate the capacitance measurement from the comb drive to the control state of the switch. Furthermore, not all optical switches use comb drive actuators.

Some of the prior art approaches require electrostatic clamping of a mirror structure to various electrodes in its different positions. For example, Behin et al. describe an optical crossbar switch consisting of a series of moveable mirrors that are magnetically actuated and can be electrostatically clamped either in the horizontal position to the substrate or in the vertical position to the sidewalls of a separate chip. Fujita et al. describe similar micromirrors that are electrostatically clamped against a shallow stop when deflected vertically.

FIG. 1 depicts an optical crossbar switch 100 that contains mirrors 102 that rotate between horizontal and vertical positions in order to switch optical signals 104 between one or more input fibers 106 and one or more output fibers 108. The mirrors 102 are typically rotated by a combination of magnetic force and mechanical torsion in a hinge member (not shown) at the axis of rotation of the mirror. Optical switches like that shown in FIG. 1 are described in detail in U.S. Pat. No. 4,580,873, entitled "Optical Matrix Switch," Issued Apr. 8, 1986 to Frank H. Levinson, which is incorporated herein by reference. Comb drives are generally not used to actuate this type of switch because it is difficult to create a comb drive that could directly move the mirror over the desired angular range without some additional mechanical linkage. One means for fault detection in optical switches involves monitoring of the optical signals received by the output fibers 108. A splitter incorporated into the switch or fiber taps at the output fibers 108 can be used to monitor the output signals. This prior art method may also require monitoring of the input signal, since the criteria for failure is often a discrepancy between the input and the output signals. Unfortunately, monitoring the input and output optical signals incurs additional optical losses to the switch 100 since it requires tapping optical energy from the signals for monitoring. Furthermore, monitoring the input and output signals does not specifically indicate the cause of the failure, as the mirror position is not directly monitored.

There is a need, therefore, for an improved MEMS device with improved fault detection to directly detect faults in the control state of the mirror positioning mechanism.

OBJECTS AND ADVANTAGES

Accordingly, it is a primary object of the present invention to provide microelectromechanical system (MEMS) device having a fault detection system that directly measures mirror control state.

SUMMARY

The objects and advantages are attained by an apparatus and method that allow for detection of whether a rotatable MEMS element is in a first or second position, , e.g., horizontal or vertical, and whether it is properly clamped in either of these two positions. This sensing capability is useful for fault detection. By sensing the mirror position, mirror failure can be immediately detected, and traffic through the switch can be appropriately re-routed. Embodiments of the invention provide apparatus and methods for detecting whether mirrors used in a certain type of optical switch are in the "on" or "off" position. Specifically, this invention applies to switches that employ mirrors that move between an "on" or "off" position, wherein they reflect light from an input fiber into an output fiber in the "on" position, and allow the light to pass in the "off" position. Electrodes are positioned in this system such that the mirrors are close to, and therefor capacitively coupled to, a different electrode depending on whether they are in the "on" or "off" position. This invention is especially useful for switches that already employ electrodes for electrostatic clamping of mirrors in one or more positions, since those same electrodes can be used both to electrostatically clamp the mirrors and to sense their position. The method described in this invention comprises sensing of the capacitance between the mirrors and the one or more electrodes used to clamp the mirrors in its one or more positions in order to detect which of the positions the mirrors are clamped in. Furthermore, the magnitude of the capacitances can be monitored to detect improper clamping. The apparatus may be incorporated into a MEMS mirror optical switch controlled by a computer processor.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 2A:
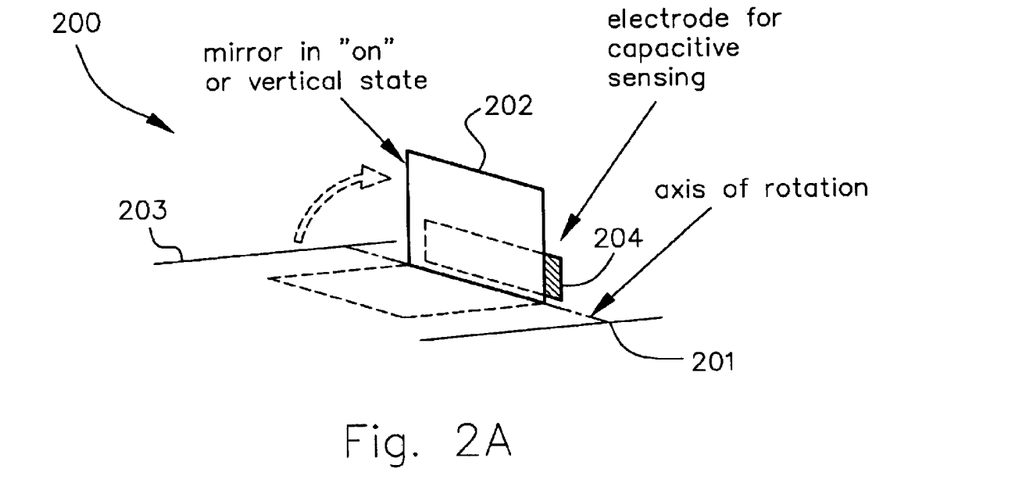
FIG. 2A–2B depict simplified schematic diagrams of a MEMS device according to an embodiment of the present invention.
Figure 2B:
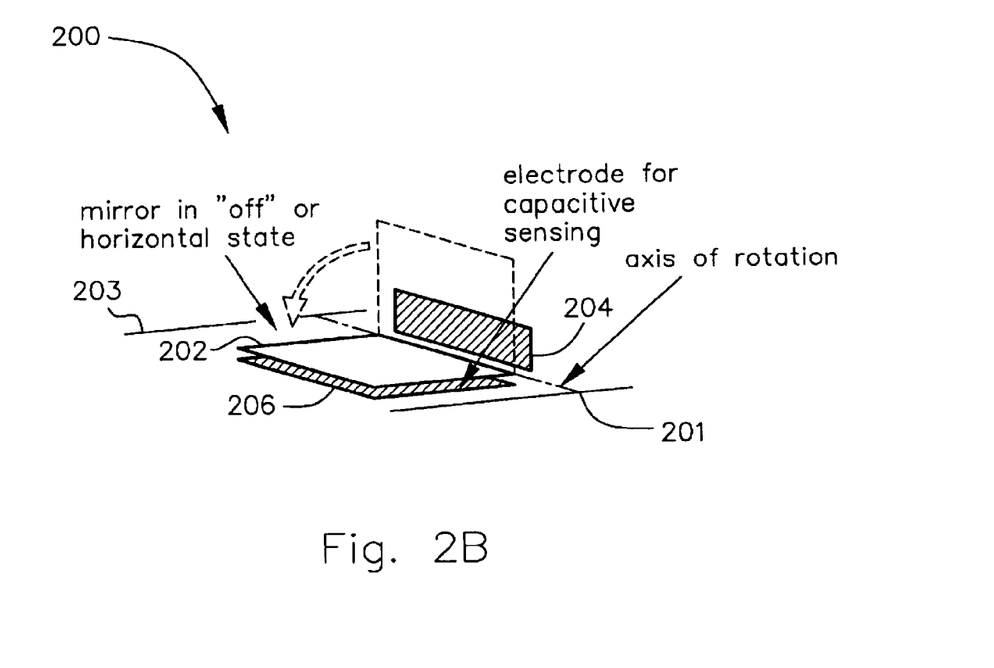

FIGS. 2A–2B depict an apparatus 200 according to an embodiment of the invention. The apparatus generally comprises a rotatable element 202, and first and second electrodes 204, 206. The first electrode 204 is typically located adjacent to the element 202 when element 202 is in its vertical position. The second electrode 206 is typically located adjacent to the element 202 when element 202 is in its horizontal position. For the purpose of example, and without loss of generality, the rotatable element 202 may be a MEMS mirror that rotates about a substantially horizontal axis 201 relative to a static part 203. The rotatable element may include a separate electrode for clamping or capacitance sensing. Alternatively, if the rotatable element 202 is electrically conductive, the element 202 itself may be regarded as an electrode. In the exemplary embodiment depicted in FIGS. 2A–2B the rotatable element 202 rotates between two positions that are substantially 90° apart. In particular, the rotatable element rotates between a vertical position, as shown in FIG. 2A, and a horizontal position, as shown in FIG. 2B. The vertical position defines a first or "on" control state. The horizontal position defines a second or "off" control state. In the embodiments of the present invention the capacitance between the rotatable element 202 and the electrodes 204,206 depends on whether the rotatable element is in the first or second position.

The first electrode 204 can be placed so that it is disposed close to and substantially parallel with the rotatable element 202 in the vertical position. The capacitance between the rotatable element 202 and the first electrode 206 can be monitored to determine the control state of the rotatable element 202. For example when the rotatable element 202 is flipped to the vertical position from the horizontal position, the capacitance between the element 202 and the first electrode 204 changes from a low value to a much higher value. At the same time, the capacitance between the rotatable element 202 and the second electrode 206 changes from a high value to a lower value. In a similar fashion, the capacitance between the second electrode 206 and the rotatable element 202 can be used to detect the control state of the when it is in the horizontal position. The magnitude of the "on"-state capacitance is known, and if the element 202 is somehow improperly positioned in the "on" state, the capacitance may not reach the known value, and a fault may be indicated.

In the device 200, the electrodes 204, 206 may also serve as clamping electrodes as well as for capacitive control state sensing. Alternatively, the device 200 may include separate electrodes for sensing and clamping. In the case of an array of rotatable elements, e.g., MEMS mirrors, the electrodes for the "off", or horizontal, state detection may be electrically shorted to each other. In such a case, the static part 203 may comprise a substrate to which the mirrors are mounted. Similarly, the "on", or vertical, state electrodes may comprise a single component with features that define a vertical electrode for each mirror.

Figure 3:
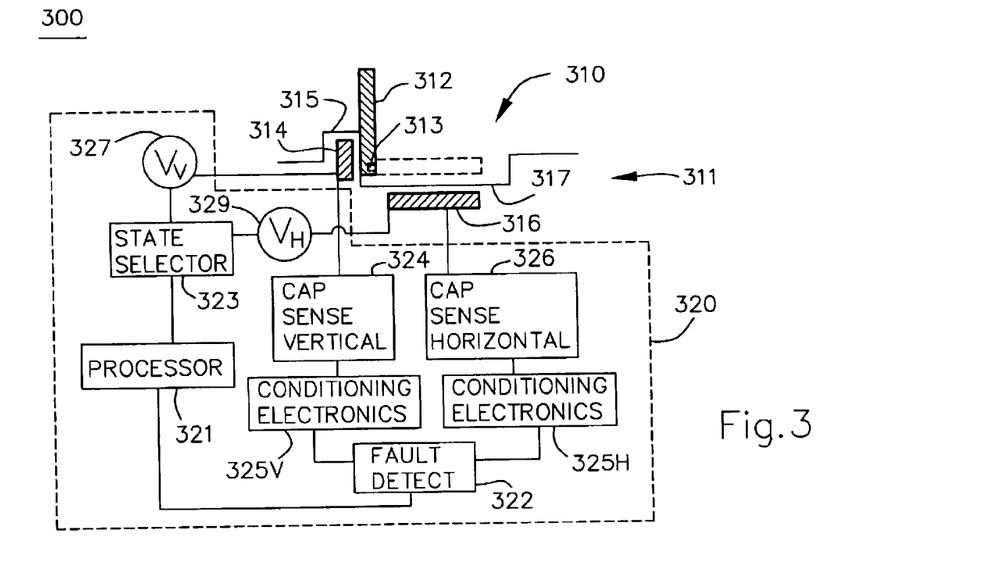
FIG. 3 depicts a simplified block diagram of an MEMS apparatus according to an embodiment of the present invention.

FIG. 3 depicts a simplified cross-sectional schematic diagram of an apparatus 300 according to an embodiment of the present invention. The apparatus generally comprises a MEMS device 310, and a device controller 320. The device 310 typically includes a substrate 311 and a rotatable element 312, such as a mirror. The substrate 311 includes a vertical stop 315 and a horizontal stop 317. The rotatable element 312 rotates about an axis oriented substantially parallel to a plane of the substrate 311. The rotatable element 312 may be attached to the substrate 311 by a torsional flexure 313. The rotatable element 312 rotates, e.g. under magnetic actuation, between a vertical position proximate the vertical stop 315 and a horizontal position proximate the horizontal stop 317. The substrate 311 further includes vertical and horizontal electrodes 314, 316 proximate the vertical and horizontal stops 315, 317. The electrodes 314, 316 are typically electrically isolated from each other and from the rotatable element 312. The controller 320 typically includes a processor 321, a fault detector 322, a state selector 323, vertical and horizontal capacitance sensors 324, 326 and vertical and horizontal power voltage sources 327, 329. The state selector 323 and fault detector 322 are coupled to the processor 321. The capacitance sensors 324, 326, are coupled to the electrodes 314, 316 respectively and to the fault detector 322. Conditioning electronics 325V, 325H, such as amplifiers or analog to digital (A/D) converters, may optionally be coupled between the capacitance sensors 324, 326 and the fault detector 322. In the embodiment shown in FIG. 3, the voltage sources 327, 329 are coupled to the electrodes 314, 316 respectively. The voltage sources 327, 329 supply clamping voltages to the electrodes 314, 316 to clamp the rotatable element to the vertical stop 315 or the horizontal stop 317. Alternatively, the device 310 may include separate clamping electrodes coupled to the voltage sources 327, 329.

For example, it is often the case that the capacitance sensors are coupled to conditioning electronics that interpret the signals from the capacitance sensors. Such conditioning electronics may include amplifiers, analog-to-digital converters, and the like. It is often desirable to ensure that the conditioning electronics receive signals from the sensors having an acceptable level of noise. The acceptable value of the noise level depends on the circuit and the required precision in the specific application. For very small capacitance signals, e.g., of order $10^{-15}$ farads, this may affect the design of the apparatus.

For example, to reduce the signal to noise ratio, it may be important that the conditioning electronics be located in close proximity to the capacitive sensors. A short distance between the sensors and the electronics reduces the amount of wiring between them, thereby reducing noise. Close proximity between the sensor and the electronics may be ensured by placing the conditioning electronics in the same packaging as the sensor, e.g., on a die adjacent to a die containing a MEMS device with the sensors. The sensors and conditioning electronics may be connected by wire bonding across the die. Alternatively, the conditioning electronics may be integrated into the same die as the MEMS die itself.

Although only a single device 310 with a rotatable element 312 is shown in FIG. 3, those of skill in the art will recognize that the device 310 may include an array containing any number of such devices. Furthermore, the inventive concepts described herein may also be applied to micromirror architectures such as those described in H. Toshiyoshi and H. Fujita, "Electrostatic micro torsion mirrors for an optical switch matrix," *J. Microelectromech. Syst.*, vol. 5, no. 4, 231–7, Dec. 1996 and E. L. Goldstein, and R. W. Tkach, "Free-space micromachined optical switches with sub-millisecond switching time for large-scale optical crossconnects," OFC'98 and IEEE Photonics Technol. Lett., Apr. 1998, both of which are incorporated herein by reference.

Figure 4A:
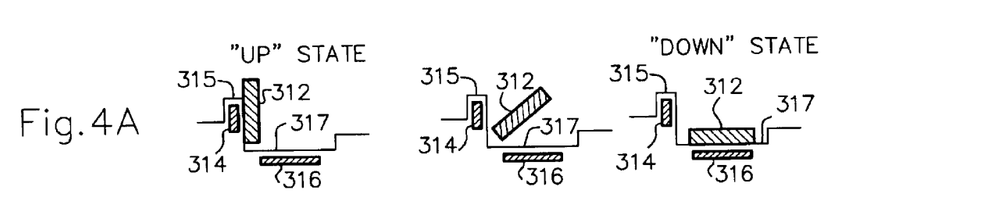
FIG. 4A depicts simplified cross sectional schematics of the apparatus of FIG. 3 in three different positions.
Figure 4B:
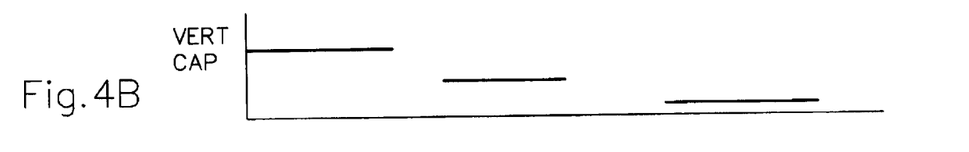
FIGS. 4B–4C depict capacitance values corresponding to the three positions depicted in FIG. 4A.
Figure 4C:
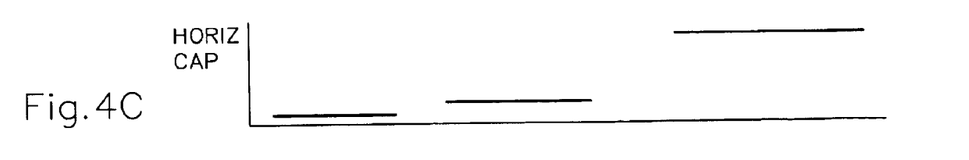

The relationship between the position of the rotatable element 312 and the capacitance values measured by the sensors 314, 316 is illustrated in FIGS. 4A–4C. When the rotatable element is in the vertical state, as shown on the left in FIG. 4A, a large capacitance is detected between the rotatable element 312 and the vertical electrode 314, and a small capacitance is detected between the rotatable element 312 and the horizontal electrode 316 as shown on the left of FIGS. 4B and 4C. This combination of capacitances indicates that the rotatable element 312 is in an "up" digital control state. When the rotatable element 312 is switching and is in between the vertical position and the horizontal position (or vice versa), as shown in the middle in FIG. 4A, a small capacitance is detected between the rotatable element 312 and both the horizontal electrode 316 and the vertical electrode 314 as shown in the middle of FIGS. 4B and 4C. When the rotatable element 312 is in the horizontal position, as shown on the right in FIG. 4A, a large capacitance is detected between the rotatable element 312 and the horizontal electrode 316, and a small capacitance is detected between the rotatable element 312 and the vertical electrode 314 as shown on the right of FIGS. 4B and 4C. This combination of capacitances indicates that the rotatable element 312 is in a "down" digital control state. The capacitance can be measured across the same electrical connections that are used to supply the electrostatic clamping voltages from the voltage sources 327, 327 and the electrodes 314, 316.

The processor 321 determines the appropriate control state for the rotatable element 312 and supplies a control signal to the state selector 323 and the fault detector 322. The state selector 323 determines which voltage source 327, 329 applies a clamping voltage based on a control signal from the processor. Those of skill in the art will recognize that the state selector 323 may be implemented in either hardware, software or a combination of both. Although two voltage sources 327, 329, are depicted in FIG. 3, the control state selector may alternatively be connected to a single voltage source, which is selectively coupled to the electrodes 314, 316 by a switch. The fault detector 322 compares the control signal from the processor to a measured control state determined by measurements from the capacitance sensors 324, 326. In either the horizontal or vertical position, the sensors 324, 326 can detect exact magnitude of the capacitance to indicate improper clamping of the rotatable element 312. For example, if a particle (e.g. a piece of dust) lands on one of the clamping surfaces and causes the mirror to clamp at an improper angle to the vertical sidewall, the capacitance detected between the rotatable element 312 and the vertical electrode 314 will be different than that normally detected in the vertical control state. In such a situation the fault detector 322 would signal a fault to the processor 321. Those of skill in the art will recognize that the fault detector 322 may be implemented in either hardware, software or a combination of both.

The apparatus 300 may operate according to a method according to an embodiment of the present invention. The method 500 is set forth in the flow diagram of FIG. 5. In the method 500 begins at step 502 with the provision of an apparatus with a rotatable element and such as the apparatus 300. Electrodes, such as the vertical and horizontal electrodes 314, 316 are provided at step 504. At step 506 a capacitance between the rotatable element and one or more of the electrodes is measured, e.g. with sensors such as the sensors 324, 326. In the apparatus 300, the capacitance sensors 324, 326 measure the capacitance between the rotatable element 312 and the electrodes 314, 316 to monitor the control state of the rotatable element 312. Various methods exist for detecting the capacitance between the rotatable element 312 and the electrodes 314, 316. For example, in step 506, a small AC signal may be superimposed on top of a DC signal that is supplied by one or more of the voltage sources 327, 329 for electrostatic clamping. The sensors 314, 316 can monitor a current arising from this small AC signal to indicate the capacitance. An alternative method employs time-division multiplexing of actuation and sense signals. In this scheme, the DC actuation signal is periodically turned off and replaced by a small AC or DC sense signal. The sensors 314, 316 measure the sense signal to monitor the capacitance. Preferably, the time-multiplexing is done at a rate much faster than the natural frequency of the device The capacitance signals from the sensors 314, 316 can be used to properly time the electrostatic clamping signals used for clamping the rotatable element 312 in its two positions. For example, when the rotatable element 312 is actuated up to a position near the vertical stop 315, the processor signals the state selector to apply a voltage to the vertical electrode 314 to pull the rotatable element 312 in to the vertical stop 315 and clamp it there electrostatically. After the rotatable element 312 is pulled in, the voltage can be reduced to a lower value, since a lower voltage is needed to hold the rotatable element 312 next to the electrode 314 than that needed to pull it in. Monitoring of the capacitance signal can allow proper timing of these signals. That is, the clamp voltage would be lowered only when the capacitance value from the vertical capacitance sensor 324 indicates that the rotatable element 312 has reached the vertical position.

In the descriptions above, it is assumed that the electrodes used for clamping are also used for sensing. It is also possible to divide the electrode structures into several isolated regions, in which case one set of electrodes can be used for electrostatic clamping or actuation, and another set for capacitive sensing.

Figure 5:
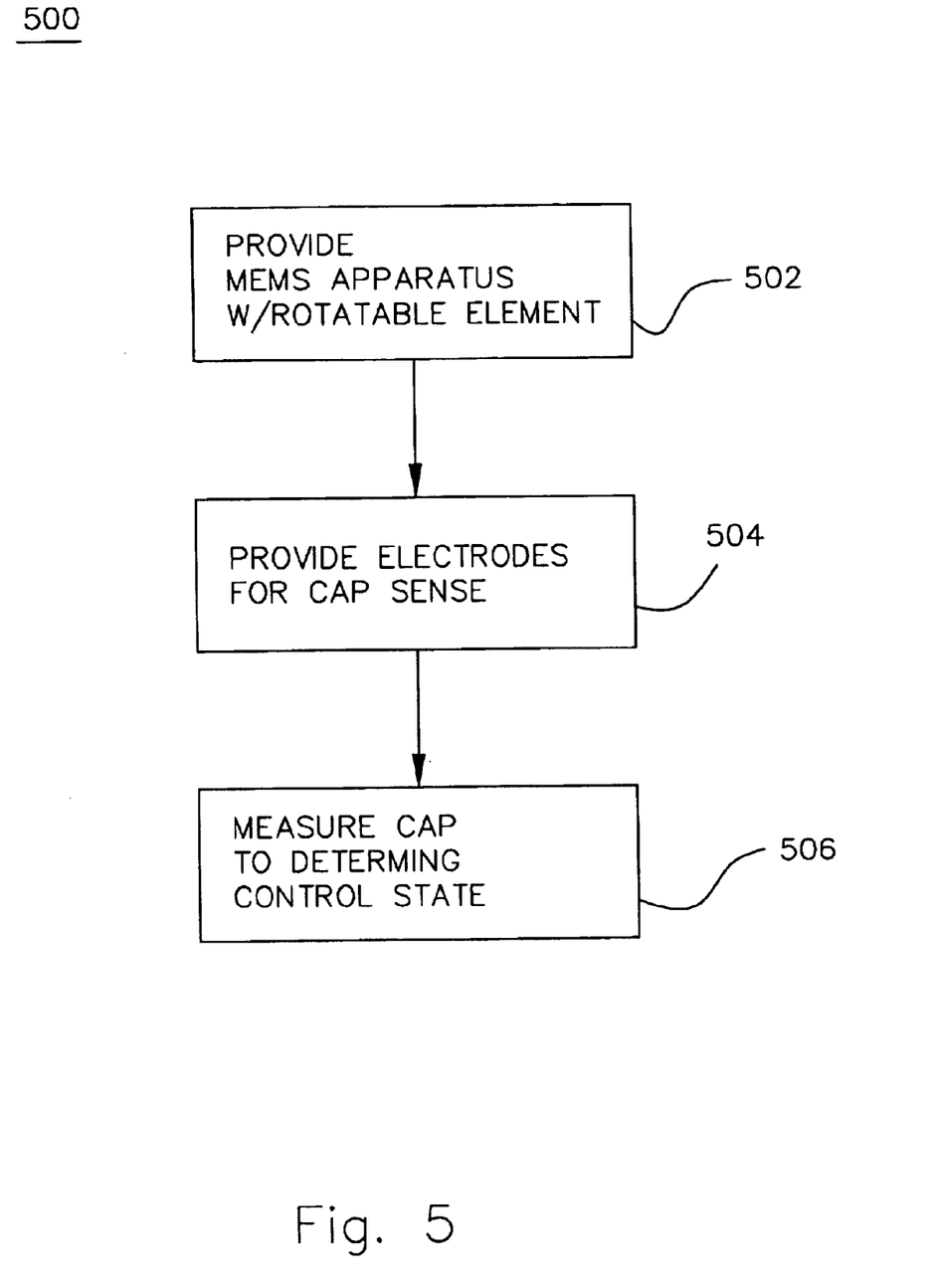
FIG. 5 depicts a simplified timing diagram for operation of a MEMS device according to an embodiment of the present invention.
Figure 6:
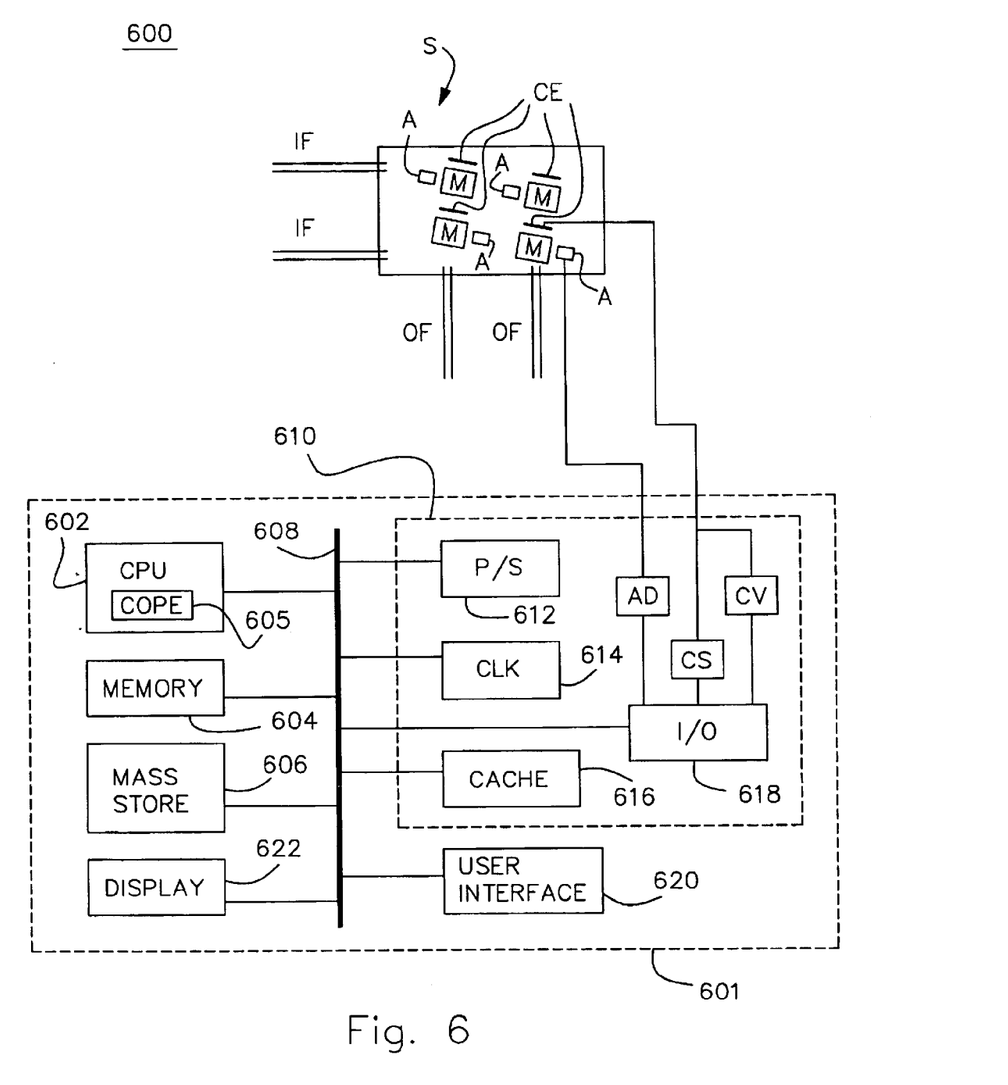
FIG. 6 depicts a block diagram depicting an optical communications system according to an additional embodiment of the invention.

FIG. 6 depicts a block diagram depicting an optical communications system 600 according to an additional embodiment of the invention. In the system 600, a method having features in common with step 506 of method 500 of FIG. 5 is implemented as a computer program code 605 running on a processor of a computer controlled apparatus having features in common with the apparatus 300 described above with respect to FIG. 3. In the exemplary embodiment shown, the program code 605 controls the operation of one or more MEMS mirrors M in a crossbar optical switch S. The switch S may have features in common with the type of switch 100 shown in FIG. 1. One or more input fibers IF and output fibers OF are coupled to the switch S. Each mirror M is rotatably coupled to a substrate and actuated by electrostatic or magnetic actuators A. The mirrors M are clamped in the vertical or horizontal position by voltages applied to clamping electrodes CE.

The system 600 includes a controller 601. The controller 601 includes a programmable central processing unit (CPU) 602 that is operable with a memory 604 (e.g., RAM, DRAM, ROM, and the like) an optional mass storage device, 606 (e.g., CD-ROM hard disk and/or removable storage), and well-known support circuits 610 such as power supplies 612, clocks 614, cache 616, input/output (I/O) circuits 618 and the like. All of the above elements may be coupled to a control system bus 608.

The memory 604 contains instructions that the processor unit 602 executes to facilitate the performance of the apparatus 600. The instructions in the memory 604 are in the form of the program code 605. The program code may conform to any one of a number of different programming languages. For example, the program code can be written in C+, C++, BASIC, Pascal, JAVA or a number of other languages. The mass storage device 606 stores data and instructions and retrieves data and program code instructions from a processor readable storage medium, such as a magnetic disk or magnetic tape. For example, the mass storage device 606 can be a hard disk drive, floppy disk drive, tape drive, or optical disk drive. The mass storage device 606 stores and retrieves the instructions in response to directions that it receives from the processor unit 602. The processor unit 602 operates the apparatus 600 using data and program code instructions that are stored and retrieved by the memory 604 and/or the mass storage device 606. The data and program code instructions may be first retrieved by the mass storage device 606 from a medium and then transferred to the memory 604 for use by the processor unit 602.

The apparatus 600 may optionally include a user interface 620, such as a keyboard, mouse, or light pen, coupled to the processor unit 602 to provide for the receipt of inputs from an operator (not shown). The apparatus 600 may also optionally include a display unit 622 to provide information to the operator in the form of graphical displays and/or alphanumeric characters under control of the processor unit 602.

The control system bus 608 provides for the transfer of data and control signals between all of the devices that are coupled to the control system bus 608. Although the control system bus 608 is displayed as a single bus that directly connects the devices in the processor unit 602, the control system bus 608 can also be a collection of busses. For example, the display unit 622, user interface 620 and mass storage device 606 can be coupled to an input-output peripheral bus 608, while the processor unit 602 and memory 604 are coupled to a local processor bus. The local processor bus and input-output peripheral bus are coupled together to form the control system bus 608.

The system controller 601 is coupled to the elements of the apparatus 600, for turning off a source of optical power in accordance with embodiments of the present invention via the system bus 608 and the I/O circuits 618. These elements include the following: one or more clamping voltage sources CV and capacitance sensors CS coupled to clamping electrodes CE in the switch S, and one or more actuator drivers AD coupled to the actuators A. For the sake of clarity, connection is shown to only one of the clamping electrodes CE and one of the actuators A. In practice, all the clamping electrodes CE and actuators A could be coupled to the I/O circuits 618. The system controller 601 provides signals to the above elements to switch optical signals between the input fibers IF and the output fibers OF.

The steps of the method of the method described above with respect to FIG. 5 could be implemented by a suitable computer program running on the CPU 602 of the controller 601. The CPU 602 forms a general purpose computer that becomes a specific purpose computer when executing programs such as the program 505 of the embodiment of the method of the present invention depicted in the flow diagram of FIG. 2. Although the invention is described herein as being implemented in software and executed upon a general purpose computer, those skilled in the art will realize that the invention could be implemented using hardware such as an application specific integrated circuit (ASIC), microcontroller or other hardware circuitry. As such, it should be understood that the invention can be implemented, in whole or in part, in software, hardware or both.

Those skilled in the art would be readily able to devise a computer program 605 to implement step 506 described above with respect to FIG. 5. The program 605 is suitable for monitoring and controlling the switch S in accordance with embodiments of the present invention. Although the program 605 is described herein with respect to a MEMS optical switch, those skilled in the art will recognize that programs embodying the method of the present invention can be applied to any MEMS device.

It will be clear to one skilled in the art that the above embodiments may be altered in many ways without departing from the scope of the invention. Accordingly, the scope of the invention should be determined by the following claims and their legal equivalents.

What is claimed is:

1. A microelectromechanical device, comprising
   a. a rotating element including a first electrode;
   b. a vertical stop disposed proximate the rotating element;
   c. a second electrode;
   d. means, coupled to the first and second electrodes for measuring a capacitance between them; and
   e. means coupled to the capacitance sensing means for determining from the capacitance a digital control state of device.

2. The device of claim 1 further comprising means for determining a deviation from a desired control state.

3. The device of claim 1 wherein the element has two control states.

4. The device of claim 1, further comprising means for rotating the rotatable element.

5. The device of claim 1 wherein the element is a MEMS mirror.

6. A microelectromechanical system (MEMS) apparatus, comprising
   a. an element configured to rotate between a first control state and a second control state;
   b. a vertical stop disposed proximate the element;
   c. one or more electrodes disposed proximate the element, wherein a capacitance between the element and the one or more electrodes has a first value when the element is in the first control state and the capacitance has a second value when the element is in the second control state;
   d. means, for measuring a value of the capacitance between the element and the at least one of the one or more electrodes; and
   e. means coupled to the capacitance sensing means for determining a control state of the element from the value of the capacitance.

7. The device of claim 6 wherein the first and second angular positions are substantially 90° apart.

8. The device of claim 6 further comprising means for actuating the element.

9. The device of claim 6 further comprising means for electrostatically clamping the element in at least one of the first and second positions.

10. The device of claim 9, wherein the clamping means comprises a clamping voltage source electrically coupled to one or more of the one or more electrodes.

11. The device of claim 6, further comprising a substrate, wherein the element connected to the substrate by a hinge.

12. The device of claim 11, wherein the one or more electrodes includes an electrode disposed on the substrate proximate the element.

13. The device of claim 11, wherein the substrate includes a vertical stop disposed proximate the element.

14. The device of claim 13, wherein the one or more electrodes includes an electrode attached to the vertical stop.

15. The device of claim 6, wherein the element is a MEMS mirror.

16. A method for sensing the control state of a microelectromechanical device, comprising:

measuring a value of a capacitance between a rotatable element and one or more of a first and second electrode disposed proximate the rotatable element to determine whether the rotatable element is in a first control state, a second control state, or neither the first nor second control state, wherein the rotatable element is in a vertical position proximate a vertical stop when the rotatable element is in the first or second control state.

17. The method of claim 16, further comprising applying an electrostatic clamping voltage to one or more of the first and second electrodes.

18. The method of claim 17, wherein the clamping voltage is a DC voltage and c) includes superimposing an AC signal on the clamping voltage.

19. The method of claim 17, wherein the clamping voltage and a sensing signal are alternately applied in time.

20. The method of claim 16 further comprising determining the presence of a fault in the microelectromechanical device from the value of the capacitance.

21. The method of claim 16 further comprising using the value of the capacitance to time the actuation of the element.

22. An optical communications system, comprising:

a) one or more input optical fibers;

b) one or more output optical fibers;

c) a microelectromechanical system (MEMS) optical switch including:

ii) one or more MEMS mirrors configured to rotate between a first angular position and a second angular position;

ii) b. a vertical stop disposed proximate one or more of the MEMS mirrors;

iii) one or more electrodes disposed proximate each of the one or more mirrors, wherein a capacitance between the mirrors and the electrodes has a first value when the mirrors are in a first control state and the capacitance has a second value when the element is in a second control state;

iv) means, for measuring a value the capacitance between at least one of the one or more mirrors and the at least one of the one or more electrodes; and v) means coupled to the capacitance sensing means for determining a control state of the element from the value of the capacitance.

* * * * *